United States Patent
Parkin (10) Patent No.: US 10,892,822 B2
(45) Date of Patent: Jan. 12, 2021

(54) OPTICAL FIBER EVENT LOCATION

(71) Applicant: British Telecommunications Public Limited Company, London (GB)

(72) Inventor: Neil Parkin, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/481,934

(22) PCT Filed: Jan. 29, 2018

(86) PCT No.: PCT/EP2018/052108
§ 371 (c)(1),
(2) Date: Jul. 30, 2019

(87) PCT Pub. No.: WO2018/141681
PCT Pub. Date: Aug. 9, 2018

(65) Prior Publication Data
US 2020/0044734 A1    Feb. 6, 2020

(30) Foreign Application Priority Data
Feb. 1, 2017  (EP) .................................... 17154281

(51) Int. Cl.
*H04B 10/07* (2013.01)
*H04B 10/079* (2013.01)
*H04Q 11/00* (2006.01)

(52) U.S. Cl.
CPC ..... *H04B 10/0791* (2013.01); *H04B 10/0793* (2013.01); *H04Q 11/0066* (2013.01); *H04B 10/07* (2013.01); *H04Q 2011/0083* (2013.01)

(58) Field of Classification Search
CPC ........... H04B 10/0791; H04B 10/0793; H04B 10/07; H04Q 11/0066; H04Q 2011/0083
(Continued)

(56) References Cited

U.S. PATENT DOCUMENTS 5,142,606 A    8/1992  Carney et al.
5,375,185 A   12/1994  Hermsen et al.
(Continued)

FOREIGN PATENT DOCUMENTS

CN    103929251 A    7/2014
CN    104238057 A   12/2014
(Continued)

OTHER PUBLICATIONS

Mittal, Packet Delay, Sep. 2014, University of California Berkeley, All Document. https://inst.eecs.berkeley.edu/~cs168/fa14/discussion/slides1.pdf (Year: 2014).*

(Continued)

*Primary Examiner* — Dibson J Sanchez
(74) *Attorney, Agent, or Firm* — Patterson Thuente Pedersen, P.A.

(57) ABSTRACT

An optical network including a processing device configured to receive from photodetectors, information indicative of a time period between loss of light received through a first optical fiber and loss of light received through a second optical fiber. The first optical fiber has a first latency and the second optical fiber has a second latency. The first optical fiber and the second optical fiber extend along a common path through the optical network: a first end of the path being defined by the photodetectors and a second end of the path being defined by a second location in the optical network. The processor is configured to calculate, based on the timing information and a difference in latency between the first optical fiber and the second optical fiber, a distance along the common path from the photodetectors to an event resulting in the losses of light.

7 Claims, 6 Drawing Sheets

(58) Field of Classification Search
USPC .................................................. 398/9–38
See application file for complete search history.

(56) References Cited

U.S. PATENT DOCUMENTS

| | | | |
|---|---|---|---|
| 5,596,670 A | 1/1997 | Debortoli et al. | |
| 5,896,211 A | 4/1999 | Watanabe | |
| 6,075,628 A * | 6/2000 | Fisher | G01M 11/3118 398/1 |
| 6,134,363 A | 10/2000 | Hinson et al. | |
| 6,233,077 B1 | 5/2001 | Alexander et al. | |
| 6,249,633 B1 | 6/2001 | Wittmeier, II et al. | |
| 6,323,981 B1 * | 11/2001 | Jensen | H04B 10/071 398/11 |
| 6,327,060 B1 * | 12/2001 | Otani | H04B 10/035 398/167 |
| 6,370,309 B1 | 4/2002 | Daoud | |
| 6,388,741 B1 * | 5/2002 | Beller | G01M 11/3118 356/73.1 |
| 6,418,266 B1 | 7/2002 | Vitantonio | |
| 6,424,443 B1 * | 7/2002 | Brindel | H04L 7/0075 398/102 |
| 6,434,313 B1 | 8/2002 | Clapp, Jr. et al. | |
| 6,534,997 B1 * | 3/2003 | Horishita | H04B 10/07 324/533 |
| 6,539,160 B2 | 3/2003 | Battey et al. | |
| 6,587,974 B1 * | 7/2003 | Majd | H04B 10/03 370/253 |
| 7,049,523 B2 | 5/2006 | Shuman et al. | |
| 7,656,535 B2 | 2/2010 | Healey et al. | |
| 7,667,849 B2 | 2/2010 | Sikora et al. | |
| 7,697,795 B2 | 4/2010 | Heatley et al. | |
| 7,711,267 B2 * | 5/2010 | Wellbrock | H04L 43/0811 398/33 |
| 7,755,971 B2 | 7/2010 | Heatley et al. | |
| 7,796,896 B2 | 9/2010 | Sikora et al. | |
| 7,817,279 B2 | 10/2010 | Healey | |
| 7,817,891 B2 | 10/2010 | Lavenne et al. | |
| 7,848,645 B2 | 12/2010 | Healey et al. | |
| 7,961,331 B2 | 6/2011 | Healey | |
| 7,974,182 B2 | 7/2011 | Healey et al. | |
| 7,995,197 B2 | 8/2011 | Sikora et al. | |
| 8,000,609 B2 | 8/2011 | Healey et al. | |
| 8,003,932 B2 | 8/2011 | Sikora et al. | |
| 8,027,584 B2 | 9/2011 | Healey | |
| 8,045,174 B2 | 10/2011 | Sikora et al. | |
| 8,189,983 B2 | 5/2012 | Brunet et al. | |
| 8,396,360 B2 | 3/2013 | Healey et al. | |
| 8,655,135 B2 | 2/2014 | Barker et al. | |
| 8,670,662 B2 | 3/2014 | Healey et al. | |
| 9,271,058 B2 | 2/2016 | Lord | |
| 9,560,429 B2 | 1/2017 | Lord | |
| 9,654,248 B2 | 5/2017 | Wright et al. | |
| 9,693,123 B2 | 6/2017 | Lord | |
| 9,748,021 B2 | 8/2017 | Warren et al. | |
| 9,860,012 B2 | 1/2018 | Wright et al. | |
| 10,432,302 B1 * | 10/2019 | Delgado | G01M 11/3154 |
| 2003/0202765 A1 | 10/2003 | Franklin et al. | |
| 2003/0223725 A1 | 12/2003 | Laporte et al. | |
| 2004/0173733 A1 | 9/2004 | Korn | |
| 2005/0174563 A1 * | 8/2005 | Evans | H04B 10/85 356/73.1 |
| 2006/0263039 A1 | 11/2006 | Chiang | |
| 2007/0041006 A1 * | 2/2007 | Abbott | H04B 10/071 356/73.1 |
| 2007/0076884 A1 | 4/2007 | Wellbrock et al. | |
| 2007/0098342 A1 | 5/2007 | Temple, Jr. et al. | |
| 2007/0183732 A1 | 8/2007 | Wittmeier et al. | |
| 2007/0212063 A1 | 9/2007 | Meli | |
| 2008/0232795 A1 | 9/2008 | Klar et al. | |
| 2009/0047019 A1 | 2/2009 | Palacharla et al. | |
| 2009/0226168 A1 | 9/2009 | Boduch | |
| 2010/0008631 A1 | 1/2010 | Herbst | |
| 2010/0150547 A1 * | 6/2010 | Xia | H04B 10/071 398/13 |
| 2011/0081125 A1 | 4/2011 | Barker et al. | |
| 2012/0087661 A1 | 4/2012 | Look | |
| 2012/0195428 A1 | 8/2012 | Wellbrock et al. | |
| 2012/0217061 A1 | 8/2012 | Runzel, IV et al. | |
| 2012/0224846 A1 * | 9/2012 | Swanson | H04B 10/85 398/13 |
| 2014/0133844 A1 * | 5/2014 | Dahlfort | H04B 10/0771 398/10 |
| 2014/0133845 A1 | 5/2014 | Dahlfort et al. | |
| 2014/0140669 A1 | 5/2014 | Islam et al. | |
| 2014/0147086 A1 | 5/2014 | Chapman et al. | |
| 2014/0216782 A1 | 8/2014 | Erlendsson | |
| 2014/0260638 A1 * | 9/2014 | Hood | G01N 29/14 73/647 |
| 2014/0341575 A1 | 11/2014 | Choi et al. | |
| 2015/0326955 A1 | 11/2015 | Lord et al. | |
| 2016/0013864 A1 | 1/2016 | Rafel Porti et al. | |
| 2016/0057515 A1 | 2/2016 | Lord | |
| 2016/0344470 A1 * | 11/2016 | Reddy Bovilla | H04B 10/03 |

FOREIGN PATENT DOCUMENTS

| | | |
|---|---|---|
| CN | 205484963 U | 8/2016 |
| DE | 29518024 U1 | 1/1996 |
| EP | 0108590 A1 | 5/1984 |
| EP | 0215668 A2 | 3/1987 |
| EP | 0428931 A2 | 5/1991 |
| EP | 0562770 A2 | 9/1993 |
| EP | 0812078 A2 | 12/1997 |
| EP | 0859257 A1 | 8/1998 |
| EP | 0926479 A1 | 6/1999 |
| EP | 1063656 A2 | 12/2000 |
| EP | 1432149 A1 | 6/2004 |
| EP | 1774695 A2 | 4/2007 |
| EP | 2131123 A2 | 12/2009 |
| EP | 2266250 A1 | 12/2010 |
| EP | 2450728 A1 | 5/2012 |
| GB | 2161614 A | 1/1986 |
| GB | 2179145 A | 2/1987 |
| GB | 2187305 A | 9/1987 |
| GB | 2472178 B | 3/2013 |
| GB | 2514134 A | 11/2014 |
| GB | 2514134 B | 5/2016 |
| JP | S5589721 A | 7/1980 |
| JP | 2537950 B2 | 9/1996 |
| JP | 2001057115 A | 2/2001 |
| WO | WO-9938042 A1 | 7/1999 |
| WO | WO-2006014298 A2 | 2/2006 |
| WO | WO-2008033997 A1 | 3/2008 |
| WO | WO-2008059187 A1 | 5/2008 |
| WO | WO-2009112286 A1 | 9/2009 |
| WO | WO-2012071490 A2 | 5/2012 |
| WO | WO-2013063041 A1 | 5/2013 |
| WO | WO-2018060530 A1 | 4/2018 |
| WO | WO-2018141681 A1 | 8/2018 |
| WO | WO-2018166920 A1 | 9/2018 |
| WO | WO-2019016263 A1 | 1/2019 |

OTHER PUBLICATIONS

Michael S. Borella, et al., "Optical Components for WDM Lightwave Networks", *Proceedings of the IEEE*, vol. 85, No. 8, Aug. 1, 1997, 35 Pgs.

Application and Filing Receipt for U.S. Appl. No. 14/127,345, filed Dec. 18, 2013, Inventor(s): Lord.

Extended European Search Report for Application No. 17154281.4, dated Jul. 20, 2017 (12 pgs).

Great Britain Combined Search and Examination Report under Sections 17 and 18(3) for Application No. GB1701682.5, dated Jul. 25, 2017 (2 pgs).

International Search Report and Written Opinion for Application No. PCT/EP2018/052108, dated Mar. 27, 2018 (13 pgs).

Aleksic S., et al., "Impairment Evaluation toward QKD Integration in a Conventional 20-Channel Metro Network," Optical Society of America, Mar. 22-26, 2015, 3 pages.

(56) References Cited

OTHER PUBLICATIONS

Aleksic S., et al., "Towards a Smooth Integration of Quantum Key Distribution in Metro Networks," Proceedings of the 16th International Conference on Transparent Optical Networks, Jul. 6-10, 2014, pp. 1-4.
Brewer D.A., et al., "Modular Optical Plant and Access Network: Operational Aspects," Proc. EFOC & N (Technology and Infrastructure), 1995, pp. 164-167.
Chapuran T.E., et al., "Optical Networking for Quantum Key Distribution and Quantum Communications," New Journal of Physics, vol. 11, Oct. 7, 2009, pp. 1-19.
Combined Search and Examination report under section 17 and 18(3) dated Jan. 15, 2018 for Great Britain Application No. 1711705.2 filed Jul. 20, 2017, 7 pages.
Combined Search and Examination Report under Sections 17 and 18(3) for Great Britain Application No. 1704178.1, dated Sep. 14, 2017, 6 pages.
Extended European Search Report for Application No. 17161330.0, dated Aug. 30, 2017, 10 pages.
International Preliminary Report on Patentability for Application No. PCT/EP2017/075023, dated Apr. 11, 2019, 9 pages.
International Preliminary Report on Patentability for Application No. PCT/EP2018/052108, dated Aug. 15, 2019, 12 pages.
International Preliminary Report on Patentability for Application No. PCT/EP2018/055948, dated Sep. 26, 2019, 9 pages.
International Preliminary Report on Patentability for Application No. PCT/GB2015/051707, dated Sep. 20, 2016, 13 pages.
International Preliminary Report on Patentability for Application No. PCT/EP2018/069502, dated Jan. 30, 2020, 8 pages.
International Search Report and Written Opinion for Application No. PCT/EP2017/075023, dated Feb. 1, 2018, 10 pages.
International Search Report and Written Opinion for Application No. PCT/EP2018/055948, dated Jun. 8, 2018, 11 pages.
International Search Report and Written Opinion for Application No. PCT/EP2018/069502, dated Aug. 23, 2018, 9 pages.
International Search Report for Application No. PCT/GB2009/001409, dated Dec. 4, 2009, 6 pages.
International Search Report for Application No. PCT/GB2009/001416, dated Sep. 22, 2009, 6 pages.
International Search Report for Application No. PCT/GB2015/051707, dated Aug. 21, 2015, 4 pages.
Examination Report for Great Britain Application No. GB1616607.6, dated Mar. 6, 2017, 5 pages.
Nweke N.I., et al., "EDFA bypass and filtering architecture enabling QKD+WDM coexistence on mid-span amplified links," Technical Digest CD-ROM/conference on Lasers and Electro-Optics, Quantum Electronics and Laser Science Conference, Conference on Photonic Applications, Systems and Technologies, May 21, 2006, 2 pages.
Office Action dated Feb. 14, 2017 for Korean Application No. 10-2016-7036681 filed Jun. 10, 2015, 4 pages.
Prysmian Cables and Systems, "Rack & Cabinets," Issued, Feb. 1, 2010, 4 pages.
Prysmian Cables and Systems, Racks, "Optical Consolidation Rack (OCR)," Retrieved from: www.prysmiangroup.com, Apr. 2012, Issue 5, 3 pages.
Rohde H., et al., "Quantum Key Distribution Integrated into Commercial WDM Systems," IEEE, Fiber Optics Communications, Quantum Communications, Feb. 24, 2008, 3 pages.
Runser R J., et al., "Demonstration of 1.3 µm Quantum Key Distribution (QKD) Compatibility with 1.5 µm Metropolitan Wavelength Division Multiplexed (WDM) Systems," Fiber Optics Communications, Quantum Detectors, vol. 3, Mar. 6, 2005, 3 pages.
Search Report dated Dec. 15, 2012 for Great Britain Application No. GB1020663.9, filed Jun. 5, 2009, 1 page.
Search Report dated Nov. 22, 2012 for Great Britain Application No. GB1020657.1 filed Jun. 5, 2009, 1 page.
Search Report dated Mar. 26, 2012 for Great Britain Application No. GB1020657.1 filed Jun. 5, 2009, 1 page.
Search Report dated Dec. 8, 2014 for Great Britain Application No. GB1411408.6 filed Jun. 26, 2014, 5 pages
Written Opinion for Application No. PCT/GB2015/051707, dated Aug. 21, 2015, 5 pages.

\* cited by examiner

OPTICAL FIBER EVENT LOCATION

CROSS-REFERENCE TO RELATED APPLICATION

The present application is a National Phase entry of PCT Application No. PCT/EP2018/052108, filed Jan. 29, 2018, which claims priority from European Patent Application No. 17154281.4 filed Feb. 1, 2017, each of which is fully incorporated herein by reference.

TECHNICAL FIELD

The disclosure relates to optical networks and to identification of the locations of events occurring in optical networks leading to loss-of-light.

BACKGROUND

In optical networks, such as communications networks, multiple optical fibers may be co-located in cables, in ducts, in bores, in over-head bundles or otherwise constrained to follow the same path between nodes of the network. An optical cable may hold many optical fibers. Fiber counts of up to 144 are standard within optical cables for telecommunications. Several types of optical fiber are in common use, for example G.652 single mode fibers. G.654 fibers are also used as they can reduce non-linearity and attenuation over long distances and are particularly useful in submarine cables. G.655 fibers are used where low chromatic dispersion is required and G.657 fiber is used where the effects of bending the fiber are to be minimized. The refractive index for single-mode fibers can vary, however, a figure of around 1.467 is typical for this class of fiber. It will be understood that the refractive index of a material corresponds to the inverse of the speed of light through that material and all references here to "refractive index" may be understood in terms of "speed of light".

A refractive index of 1.467 for an optical fiber indicates that light travels through the fiber at: (speed of light in vacuum)/1.467=299792/1.467=204357 km per second. Hollow glass fibers comprising a gas core surrounded by a solid sheath, are also used for transporting light, which travels through the gas core rather than a solid core as with conventional fiber. As the light in hollow glass fibers is guided through gas, rather than glass, the light can travel faster and signal delay is reduced in comparison to a conventional, solid glass fiber.

The concept of latency in optical fibers is relevant. The term "latency" is used here to indicate the delay experienced by an optical signal traveling through an optical fiber or equivalent optical guide per unit length of the optical fiber or equivalent. Latency is often expressed in microseconds per kilometer (μs/km). A lower latency corresponds to a lower refractive index of the transmission medium of the fiber and a higher speed for the transmission of light through the fiber. The latency reduction achieved through the use of hollow fibers can be as much as 1.5 μs/km when compared with solid glass fibers. Examples of commercially available hollow fibers include Hollow Core Photonic Bandgap Fiber (HC-PBGF) and Hollow Core Photonic Crystal Fiber (HC-PCF).

Connections through optical fiber cables can be subject to failure, for example due to severing of the cable as a result of excavation work in the vicinity of an underground cable or for other reasons. For example, an electrical failure at an intermediate network node located in a path between nodes of a network may result in loss of light in each fiber in that path. In such circumstances, it is useful for a network operator or cable maintenance service to be able to identify the location of the fault, e.g. in order to direct a repair team to the right location. A known method for locating a break in an optical fiber cable uses optical time-division reflectometry (OTDR). This technique relies on reflections that are generated at a fiber break. OTDR works by sending a pulse of light down the fiber and measuring the reflections that come back. Given a known speed of light value for the fiber, the time taken for the pulse to return can be used to calculate the location of the fault. However OTDR requires the use of complicated and expensive reflectometer equipment to carry out the measurement. Once a fault has been detected, sophisticated OTDR equipment may need to be transported to site in order to carry out the measurement, thus delaying the start of repair work. OTDR is also not guaranteed to indicate the location of failed equipment, such as a failed field amplification site.

Figure 1:
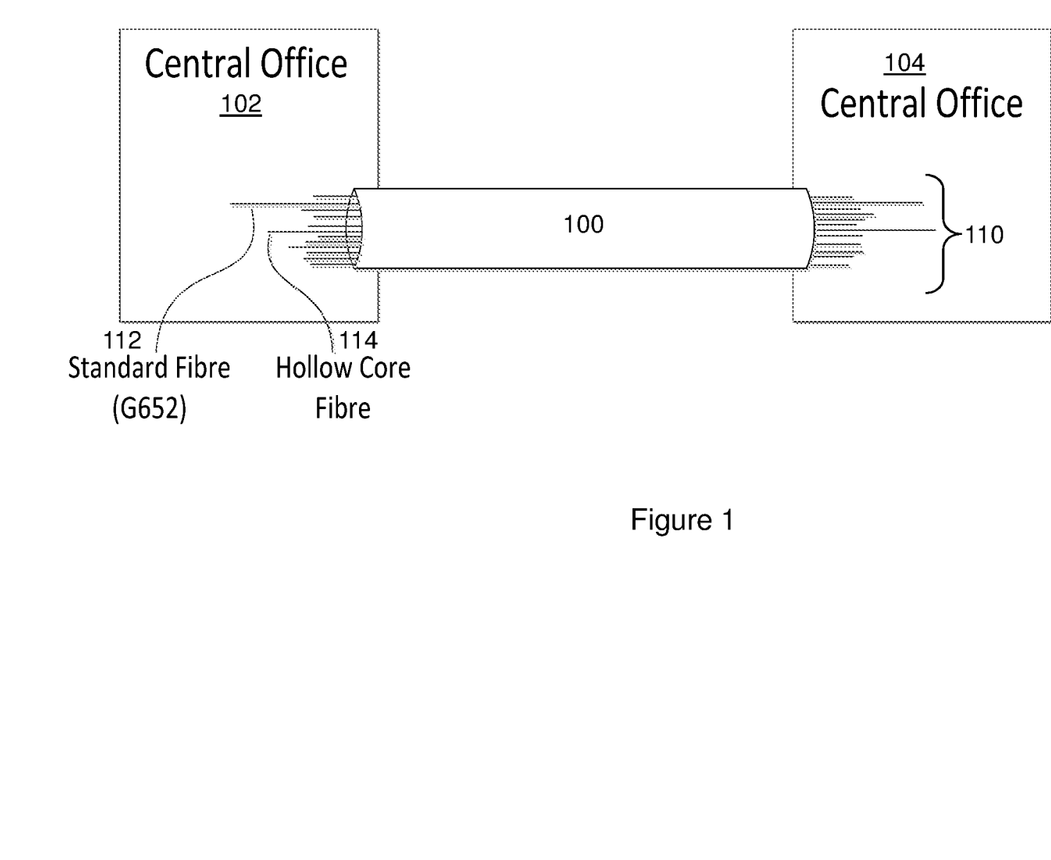
FIG. 1 shows a multi-fiber optical cable according to the prior art.

FIG. 1 shows common path 100 for optical fibers in the form of an optical cable, duct or other constrained path carrying a plurality of optical fibers 110 between central offices or other optical network nodes 102, 104. At least one of the fibers 112 is of standard type, such as G.652, and at least one other of the fibers 114 is of a hollow-core type (e.g. (HC-PBGF) or another type in which the latency is lower than the latency of the standard type fiber.

SUMMARY

A method is proposed to accurately calculate the location along a path shared by a plurality of optical fibers, of an event leading to loss-of-light in the fibers, where the event results in loss-of-light in optical fibers of different refractive indexes. The location of the causal event (i.e. the event resulting in the loss of disclosure light) is calculated from a time-difference measured between detection of loss-of-light at one end of the path in fibers having different refractive indexes.

According to a first aspect of the disclosure, there is provided a method for locating an event in an optical network, in which the method comprises: receiving from photodetectors, signaling indicative of the length of a first time period, in which the first time period extends between: a first change of state of a first photodetector between a first state in which the first photodetector detects light received through a first optical fiber and a second state in which the first photodetector detects loss of light received through the first optical fiber; and a second change of state of a second photodetector between a third state in which the second photodetector detects light received through a second optical fiber and a fourth state in which the second photodetector detects loss of light received through the second optical fiber; in which the first optical fiber has a first latency and in which the second optical fiber has a second latency; in which the first optical fiber and the second optical fiber extend along a common path through the optical network; in which a first end of the path is defined by the photodetectors and in which a second end of the path is defined by a remote location in the optical network; and in which the method comprises by dividing the length of the first time period by the difference between the first latency and the second latency, deriving an indication of the distance from the photodetectors along the path to an event resulting in the losses of light.

The light received through the first optical fiber may have the same frequency or range of frequencies as the light received through the second optical fiber. The first and second optical fibers have different refractive indices. The first and second optical fibers may comprise different materials and may be predominantly formed in the different materials. The difference in latency between the first and second optical fibers may be caused by the fact that the first and second optical fibers comprise different materials. The first optical fiber may have a different configuration to the second optical fiber. In particular, the first optical fiber may comprise an axial bore, while the second optical fiber may have a continuous solid form.

Advantageously, the method described here for calculating the location of the causal event avoids the need for complicated and expensive OTDR equipment and may, in some cases, use equipment already present in optical nodes installed in the network. For example, where the optical network node has means for indicating a loss of light to a management system.

According to a second aspect of the disclosure, there is provided an optical network comprising: a processing device configured to receive from photodetectors, information indicative of a time period between loss of light received through a first optical fiber and loss of light received through a second optical fiber; in which the first optical fiber has a first latency and in which the second optical fiber has a second latency; in which the first optical fiber and the second optical fiber extend along a common path through the optical network; in which a first end of the path is defined by the photodetectors and in which a second end of the path is defined by a second location in the optical network; in which the processor is configured to calculate, based on the timing information and a difference in latency between the first optical fiber and the second optical fiber, a distance along the common path from the photodetectors to an event resulting in the losses of light.

According to a third aspect of the disclosure, there is provided a computer program product comprising instructions which, when the program is executed by a computer, causes the computer to carry out the method of the disclosure.

BRIEF DESCRIPTION OF THE DRAWINGS

In order that the present disclosure may be better understood, embodiments thereof will now be described, by way of example only, with reference to the accompanying drawings (not to scale) in which.

DETAILED DESCRIPTION OF EMBODIMENTS

Figure 2A:
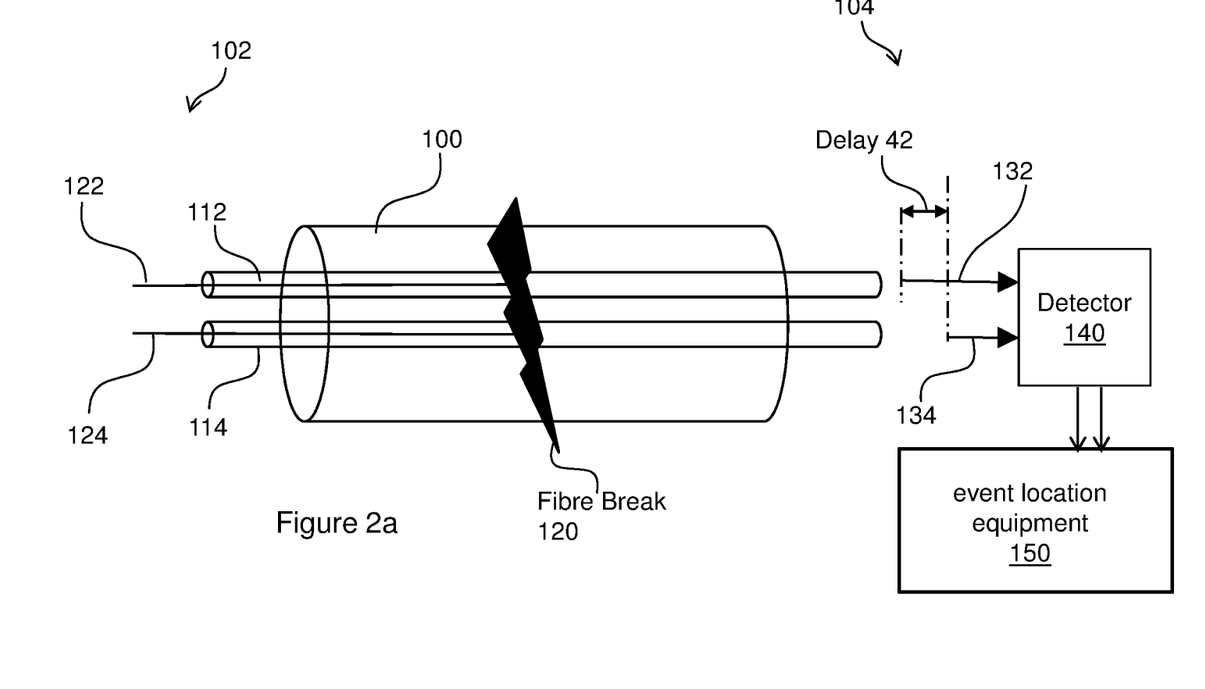
FIGS. 2a and 2b show arrangements for measurement of optical signals transported over multi fiber optical paths according to the present disclosure.

FIG. 2a shows the cable 100 of FIG. 1 and fibers 112 and 114 in more detail, together with equipment according to an embodiment. For the purposes of illustration, we consider the case where light travels along the fibers from central office 102 to central office 104, although the direction of travel does not affect the fundamental operation of the disclosure. Light 122 travels from a source at node 102 through fiber 112. Light 124 travels from a source at node 102 through fiber 114. Detection equipment 140 is positioned at the destination node 104 so as to detect the presence or absence of light in each one of fibers 112, 114. Detection equipment 140 is connected to measuring equipment 150, with which it shares information on the detection of light 122 in fiber 112 and light 124 in fiber 114. Prior to the occurrence of a break, detection equipment 140 detects light in both fibers.

Fiber 112 is a standard fiber in the sense that it has a continuous solid form. Fiber 114 is a hollow-core fiber, for example it comprises an axially extending bore containing gas. The fiber 114 has a lower latency than the standard fiber 112.

At a point in time, a break 120 occurs in the cable between nodes 102, 104, severing both of fibers 112 and 114. As shown in FIG. 2a, light 122 in fiber 112 and light 124 in fiber 114 are unable to propagate beyond the break 120, so the parts of fibers 112 and 114 beyond the break become dark. However, due to the finite speeds of light in the fibers, they do not become dark instantaneously. Although the loss of light will occur effectively simultaneously in fibers 112, 114 at the location of the break 120, due to the difference in latencies, at the destination node 104 the light 134 arriving at detector 140 through the low-latency fiber 114 will be lost before the light 132 arriving at detector 140 through the standard fiber 112.

Following the occurrence of the break, detection equipment 140 will first detect the loss of light 134 arriving at detector 140 through the low-latency fiber 114 and will only later detect the loss of light 132 arriving at detector 140 through the standard fiber 112. This is due to the time taken for the loss of light to reach detection equipment 140 through low-latency fiber 114 being less than the time taken for the loss of light to reach detection equipment 140 through standard fiber 112. There is therefore a delay 42 between the time at which loss of light is detected on fiber 114 and the time at which loss of light is subsequently detected on fiber 112. Timing information relating to detection of loss of light on each one of fibers 112, 114 is provided by detection equipment 140 to event location equipment 150 (described in more detail, below).

The timing information provided to event location equipment 150 may, for example, take the form of the times at which loss of light is detected on each one of fibers 112, 114 or a relative measure of time indicating the magnitude of the delay 42 between loss of light being detected on a first one of fibers 112, 114 and loss of light being detected on a second one of fibers 112, 114. At event location equipment 150, the time difference is divided by a value of differential latency between the two fibers (where the value of differential latency is calculated as the difference between the latency in standard-latency fiber 112 and the latency in the low-latency fiber 114). The result of the calculation provides an indication of the distance along the fiber from the destination node 104 to the fault (e.g. the fiber break). For example, if the latency value is expressed as delay per kilometer, the distance along the cable may be expressed in kilometers. This result can then be used to guide engineers as to the location of the fault. So for example if the loss of light in the standard latency fiber 112 was detected at detection equipment 140 after a delay $\Delta t=37.5$ μs from the time of detection at detection equipment 140 of the loss of light in the low-latency fiber 114 and if the differential latency between fibers 112, 114 $\Delta L=1.5$ μs per km, then, this indicates that the fiber break is located at a distance s from the destination node 104, where the value of s is given by:

$$s = \Delta t/\Delta L = 37.5/1.5 = 25 \text{ km} \quad \text{(Eqn 1)}$$

The value of the distance along the fiber from the destination node 104 to the causal event may be used to derive an indication of the geographical location of the causal event. For example, the distance calculated may be input to a geographical information system (GIS) that has been programmed with detailed information on routes followed by cable duct or other fiber paths. The GIS system will typically support a facility that allows GPS co-ordinates to be calculated for a location that is situated a set distance along a specific cable.

According to an embodiment, the detection equipment 140 comprises a number of standard optical transceivers, with each transceiver arranged to detect light received through a different fiber. According to an embodiment, for each fiber connected to an optical transceiver, the transceiver generates a "loss-of-light" signal, which is asserted when light through the fiber is not detected at the transceiver.

The transceiver loss-of-light signal may, in practice, have a turn on delay of up to 100 μs, which could result in inaccurate recording of the time when the loss of light was detected. According to an embodiment, in order to remove this inaccuracy, the loss-of-light signal delay can be calibrated at fabrication or in the field. The calibration is easily done in the factory where the transceiver is being tested prior to shipping. For example, calibration may be achieved by connecting a light source to the receiver input and monitoring the loss-of-light signal. The light is prevented from entering the receiver (e.g. the light source is turned off or the entry to the receiver blocked) and the loss-of-light signal monitored. The delay between the two events is recorded and stored in memory internal to the transceiver. This delay value can be used to correct timestamps associated with activation of the loss-of-light signal and prevent inaccurate reporting. Calibration could be done in the field, if required, for example so as to periodically verify the recorded delay value. Calibration of the delay may use technology that is integral to the device. For example, calibration in the field may be achieved by connecting to the transceiver's receiver a local laser source (e.g. via loopback from the transceiver's own transmitter) and allowing node management software to turn the transmitter off, monitor the loss-of-light signal and record the delay.

Figure 2B:
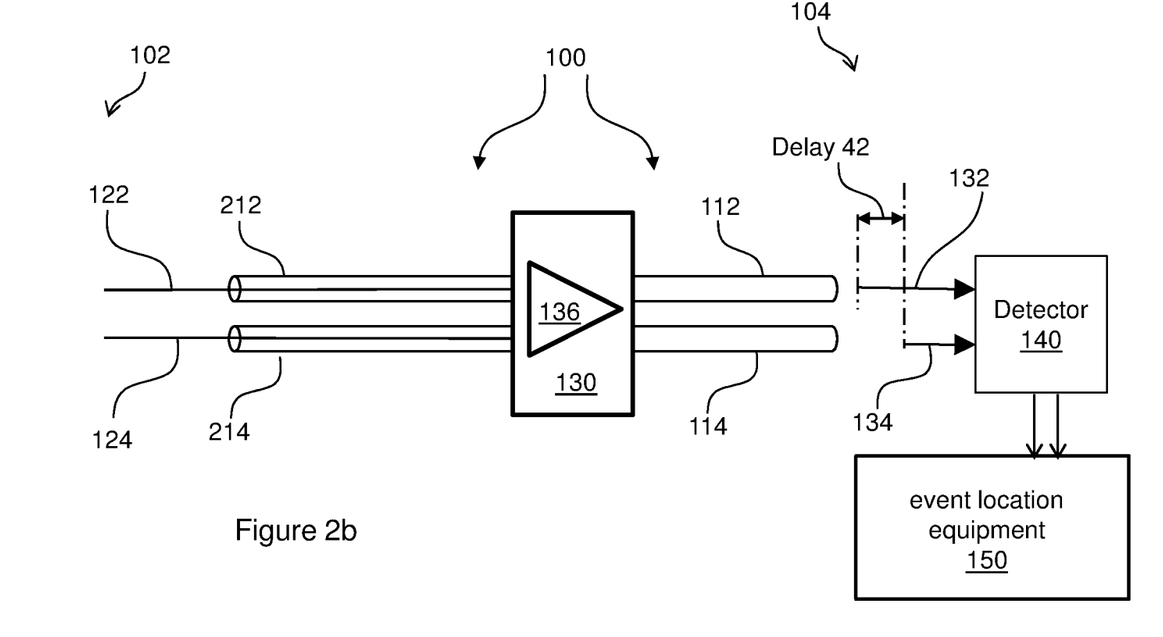

The common path between the nodes may take several forms. In addition to a cable, the optical fibers may share a common path along a duct or other protective guide or may be routed in a bundle through air, for example overhead. FIG. 2b shows two optical fibers following the same path 100 in the absence of a cable or duct, e.g. suspended together between spaced supports, although it will be understood that embodiments of the disclosure will work equally well for optical fibers sharing the same cable or duct. For example, the common path 100 of FIG. 2b may comprise an intermediate optical network node 136, which may be located mid-path at a street cabinet or central office building 130. Optical network node 136 takes power from an electrical power supply (not shown) to detect optical signals received over fibers 212, 214 from source node 102. Detected optical signals are converted to electrical signals and subsequently regenerated as optical signals onto fibers 112, 114, respectively towards destination node 104. A critical fault with optical network node 136, such as loss of power, will result in loss of light on fibers 112, 114. Due to the difference in latencies, although the loss of light will occur effectively simultaneously where fibers 112, 114 connect to optical network node 136, at destination node 104 there will be a time difference (delay 42) between detection of loss of light 134 arriving at detector 140 through the low-latency fiber 114 and detection of loss of light 132 arriving at detector 140 through the standard fiber 112.

Figure 3:
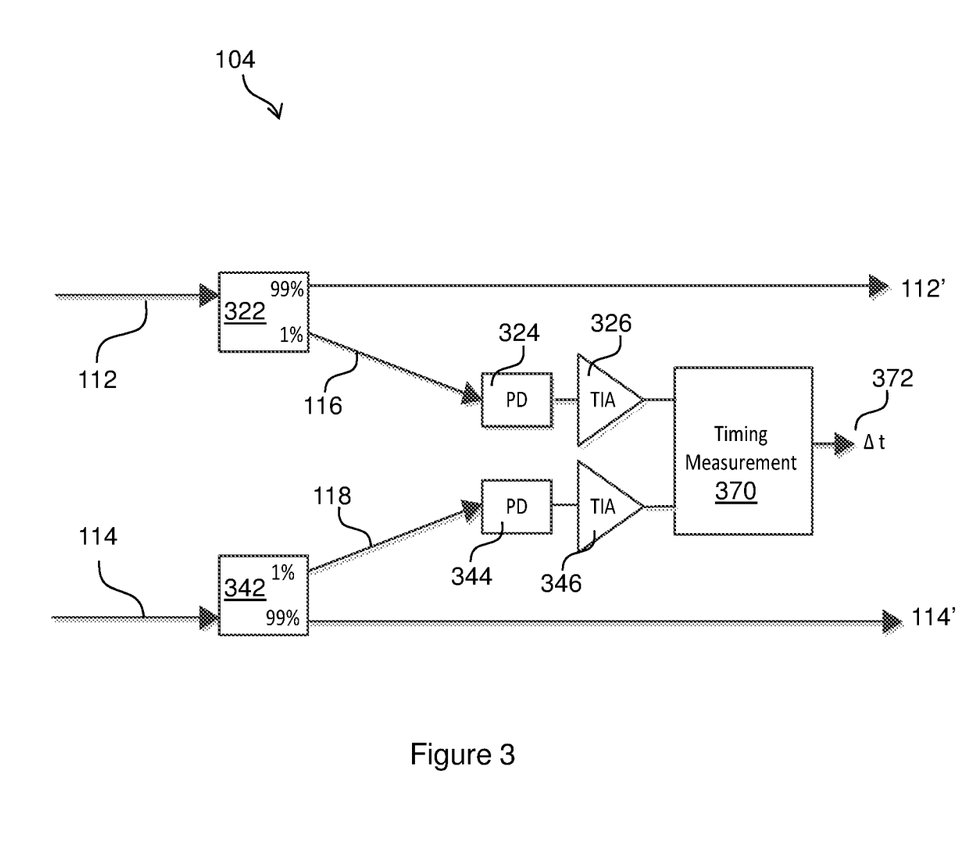
FIG. 3 shows a schematic of measuring equipment according to the present disclosure.

FIG. 3 shows an arrangement, for example located at destination node 104 according to an embodiment, comprising equipment that detects losses of signal, monitors the time delay between detections and calculates a value for the distance along the cable to the causal event. An optical tap 322, 342 on each of fibers 112, 114 diverts a small proportion (e.g. 1%) of the received light to photodetectors 324, 344 via fiber links 116, 118 configured to detect light received through an optical fibers 112 and 114, respectively. The remainder (e.g. 99%) of each received signal is allowed to continue along continuation 112' of fiber 112 and along continuation 114' of fiber 114, respectively to allow for normal operation of node 104. Accordingly, the addition of the equipment at destination node 104 has minimal effect on the normal operation of the communications network. According to an embodiment, the detection equipment comprises two photodetectors, e.g. photo-diodes (PD) 324, 344, each of which feeds a trans-impedance amplifier (TIA) 326, 346 to convert the photodiode current to voltage. The resulting voltage is fed to time measurement equipment 370 (for example a timing circuit comprising analogue-to digital converters or simple op-amp comparators) to accurately detect the time difference between the signals received from TIAs 326, 346. A value for the time difference $\Delta t$ is output 372 by time measurement equipment 370.

The latency of a type of optical fiber can be measured in the factory and a typical figure provided to the user. Onsite latency calibration, i.e. calibration in the field, may provide a more accurate value and could be carried out by data processing equipment that is installed at either end of the cable or by standard Ethernet testers (e.g. the Viavi T-BERD 5800 Handheld Network Tester). For example, a latency calculation may be performed by configuring data processing equipment installed at a first end of the path to record the time of sending, over a particular fiber, packets of data to data processing equipment that is installed at the other end of the path and by configuring the data processing equipment that is installed at the other end to provide to the first end, information on the time that the sent packets were received at the other end. Given that the data processing equipment is aware of the length of the path followed by the particular fiber, a value for the latency of the fiber may be calculated. This exercise could be done on first provisioning the fiber or on an ongoing basis. An Ethernet tester can be used to measure round-trip delay (RTD)—for example connecting the transmitter of the tester to send over a first fiber of a cable and connecting the receiver of the tester to receive from a second fiber of the same type and of the same cable, where the first and second fibers are connected at the far end. Using a distinct pattern embedded within Ethernet data transmitted over the optical fiber, it is possible to identify the receipt of the transmitted signal. There are several types of pattern can be can used. One example pattern comprises 16 consecutive bit errors. The tester measures the time period between sending and receiving the 16 bit errors. The measured time period is divided by two for a single fiber.

Figure 4:
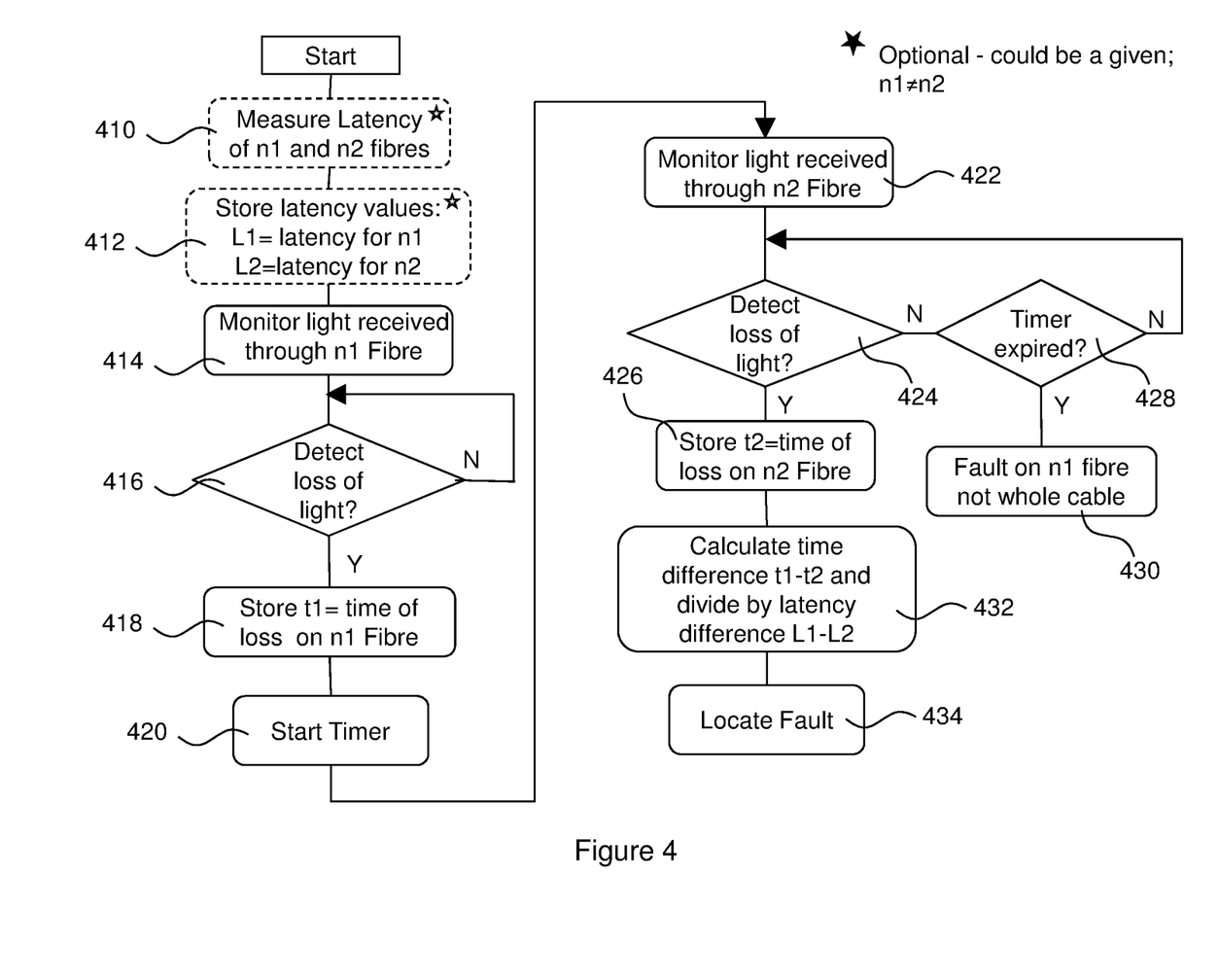
FIG. 4 shows a flow chart according to the present disclosure.

FIG. 4 illustrates operation of an optical fiber network according to an embodiment. If required, the latency values of two fibers sharing the same path but with different refractive indexes are measured 410 and stored 412. Alternatively, pre-set latency values may be used. Light received through the fibers is monitored 414. According to an embodiment, only a first fiber having the lower latency value need be monitored initially. When loss of light received through the first fiber is detected 416 and, optionally, a loss-of-light signal generated, a record is made 418 of the time at which the loss-of-light signal occurred. The time at which the loss-of-light signal occurred may be recorded in terms of reading a free-running (e.g. time of day) clock (e.g. defining a start time) or in terms of starting a timer. Light received on the second, higher latency fiber is now monitored 422. If loss of light received over the second fiber is detected 424, a record is made of the time loss-of-light signal occurred 426. Again, the time may be recorded in terms of reading a free-running (e.g. time of day) clock (e.g. defining an end time) or in terms of reading the time period from the timer.

According to an embodiment, as a guard against false readings, a timeout 428 may be defined, for example using a second timer, which is started once loss of light received through the first fiber is detected. If the timeout is reached before loss of light received over the second fiber is detected, then this it taken 430 as an indication that the fault does not affect all fibers on the path but may only affect the first fiber. According to an embodiment, the first, lower latency fiber continues to be monitored once loss of light is detected, in case light is once more detected through the first fiber. According to an embodiment, if light is once more detected through the first, lower latency fiber before loss of light received through the second fiber is detected, then this it taken as an indication that the fault may be transitory. According to an embodiment, this could be used to detect the position and time at which fiber is deformed temporarily and then released, for example, during maintenance work in cable chambers and in aggregation nodes.

If loss of light received over the second fiber is detected (or if it is detected before the timeout is reached, according to the appropriate embodiment), the time difference between detecting loss of light received over the first fiber and detecting loss of light received over the second fiber is calculated 432 (or simply read from the timer, as appropriate). A value for the distance from the destination node to the location of the causal event is then calculated 434 as indicated above, i.e. by dividing the time difference by the differential latency.

Figure 5:
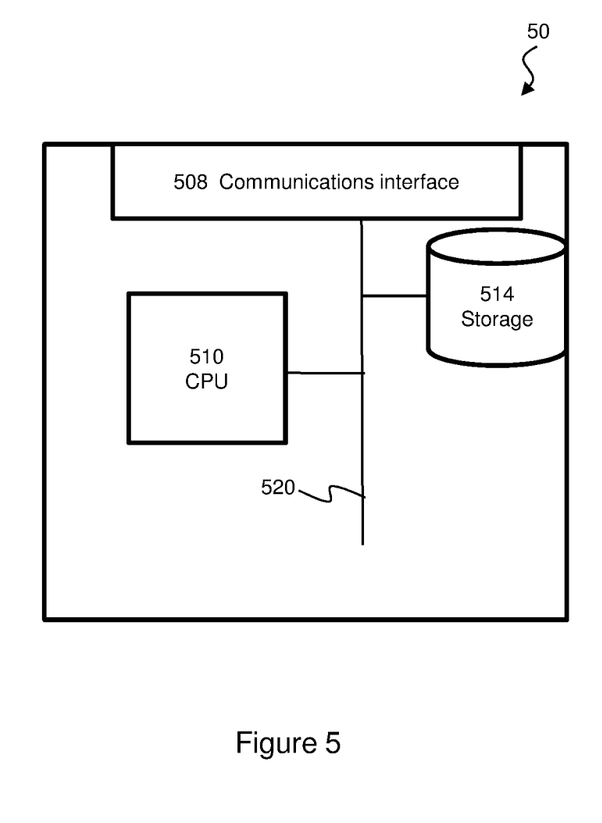
FIG. 5 is a block diagram of a data processing system suitable for the operation of embodiments of the present disclosure.

FIG. 5 is a block diagram of a data processing system 50 suitable for the operation of embodiments of the present disclosure. A processor 510 is communicatively connected to one or more communications interface 508 and storage 514 via a data bus 520. The storage 514 can comprise any suitable read-only or read/write storage device such as a random access memory (RAM) for storing data (including parameters for correcting loss-of-light signal delays and for recording timing information and fiber latency values) and a non-volatile storage device suitable for storing computer code for execution by the processor 510 in controlling operation of an optical network node or part thereof (including correcting loss-of-light signal delays and calculation of the fiber-distances to causal faults as set out above). Computer code implementing aspects of the disclosure may be stored on a carrier medium in machine or device readable form, for example in solid-state memory, magnetic memory such as disk or tape, optically or magneto-optically readable memory such as compact disk or digital versatile disk, etc. The computer code may be supplied from a remote source embodied in a communications medium such as an electronic signal, radio frequency carrier wave or optical carrier wave. Such carrier media are also envisaged as aspects of the present disclosure. Communications interface 508 may comprise an interface for communication with other devices such as sensors and optical transceivers. Communications interface 508 may comprise a data network interface for exchanging information with a data network.

According to an embodiment, the path may comprise at least one standard type optical fiber and at least one optical fiber in which the latency is higher than the latency in the standard type. It will be understood that the present disclosure works for any collection of optical fibers or similar optical guides which share a common path, such as a common cable, duct, conduit, pipe, trunking or bundle and in which at least one of the optical guides has a different latency to at least one other of the optical guides.

According to an embodiment, the recording of times of detection and time periods may be achieved by operation of the processing device or by a separate timer module, which may be implemented in hardware or be program controlled.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The disclosure is not specific to light at any wavelength or light in the visible spectrum but has application to any electromagnetic radiation that can be routed through optical fiber or similar optical guides and whose presence and absence can be detected by electrical equipment. Although primarily aimed at applications in optical communications networks, embodiments of the disclosure also have application in other optical system in which electromagnetic radiation can be routed through optical fiber or similar optical guides of different refractive index and whose presence and absence can be detected by electrical equipment Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for locating an event in an optical network, the method comprising:
   receiving from photodetectors signaling indicative of a length of a first time period, in which the first time period extends between:
      a first change of state of a first photodetector between a first state in which the first photodetector detects light received through a first optical fiber and a second state in which the first photodetector detects loss of light received through the first optical fiber, and
      a second change of state of a second photodetector between a third state in which the second photodetector detects light received through a second optical fiber and a fourth state in which the second photodetector detects loss of light received through the second optical fiber,
   wherein the first optical fiber has a first latency and in which the second optical fiber has a second latency, the first optical fiber and the second optical fiber extend along a common path through the optical network, a first end of the common path is defined by the photodetectors, and a second end of the common path is defined by a remote location in the optical network; and
   wherein the method further comprises, by dividing the length of the first time period by the difference between the first latency and the second latency, deriving an indication of a distance from the photodetectors along the path to an event resulting in the losses of light.

2. The method of claim 1, further comprising using the indication of the distance to derive a geographical location for the event.

3. The method of claim 1, further comprising:
   receiving from the photodetectors signaling indicative of a length of a second time period, wherein the second time period extends between the first change of state of the first photodetector and a third, subsequent change of state of the first photodetector between the second state and a fifth state in which the first photodetector detects light received through the first optical fiber; and
   determining, from the indicated length of the second time period, that the event relates to a transient disturbance of the first fiber.

4. The method of claim 1, further comprising:
   measuring the latency of one of the first fiber or the second fiber by recording a time of transmission, from one end of the fiber, of light through the fiber;
   receiving an indication of a time of receipt at the other end of the fiber of the light transmitted through the fiber; and
   dividing the time taken to reach the other end by a length of the fiber.

5. The method of claim 1, further comprising:
   measuring a length of a third time period between loss of light received at the photodetectors and generation of a loss-of-light signal, wherein the measuring comprises:
      connecting an optical output to the photodetectors, so that light transmitted from the optical output is detected at the photodetectors,
      transmitting at the optical output, and detecting at the photodetectors, light,
      instigating a change in the light transmitted, and
      recording an indication of a time delay between a change in the light transmitted and a corresponding change in the loss-of-light signal.

6. The method of claim 5, further comprising:
   using timing of the loss-of-light signal in determining the time of detecting loss of the light received through the optical fiber; and
   using the length of the third time period to modify the timing of the loss-of-light signal.

7. A non-transitory computer-readable storage medium storing a computer program product comprising instructions which, when the computer program product is executed by a computer, causes the computer to locate an event in an optical network by:
   receiving from photodetectors signaling indicative of a length of a first time period, in which the first time period extends between:
      a first change of state of a first photodetector between a first state in which the first photodetector detects light received through a first optical fiber and a second state in which the first photodetector detects loss of light received through the first optical fiber, and
      a second change of state of a second photodetector between a third state in which the second photodetector detects light received through a second optical fiber and a fourth state in which the second photodetector detects loss of light received through the second optical fiber,
   wherein the first optical fiber has a first latency and in which the second optical fiber has a second latency, the first optical fiber and the second optical fiber extend along a common path through the optical network, a first end of the common path is defined by the photodetectors, and a second end of the common path is defined by a remote location in the optical network; and
   wherein the method further comprises, by dividing the length of the first time period by the difference between the first latency and the second latency, deriving an indication of a distance from the photodetectors along the path to an event resulting in the losses of light.

* * * * *